US006010667A

United States Patent [19]

Meyer et al.

[11] Patent Number: 6,010,667

[45] Date of Patent: Jan. 4, 2000

[54] SHAFT REACTOR FOR TREATING BULK MATERIAL

[75] Inventors: Markus Meyer, Bertschikon; Camille Borer, Schaffhausen; Bernd Kuehnemund, Flawil; Martin Mueller, Oberuzwil, all of Switzerland

[73] Assignee: Buehler AG, Uzwil, Switzerland

[21] Appl. No.: 08/597,146

[22] Filed: Feb. 6, 1996

[30] Foreign Application Priority Data

Feb. 16, 1995 [CH] Switzerland .......................... 00448/95

[51] Int. Cl.[7] ........................................................ C08F 2/02

[52] U.S. Cl. .......................... 422/134; 422/135; 422/188; 422/196; 422/197; 422/205; 422/228; 422/229

[58] Field of Search .................................... 422/134, 135, 422/188, 196, 197, 205, 228, 229

[56] References Cited

U.S. PATENT DOCUMENTS 1,380,067 5/1921 Koch et al. ............................ 422/228
3,966,417 6/1976 Chapman ................................ 422/228
4,410,487 10/1983 Tautz et al. ............................ 376/399
4,490,896 1/1985 Small .
5,409,672 4/1995 Cetinkaya .............................. 422/189

*Primary Examiner*—Timothy McMahon
*Attorney, Agent, or Firm*—McAulay Nissen Goldberg Kiel & Hand, LLP

[57] ABSTRACT

A shaft reactor for treating bulk material, including granular bulk material, in particular for the continuous post-condensation of PET, PEN or PA in the solid phase. A uniform product flow without significant decrease of the usable contents of the reactor and a decrease of the bulk pressure in the reactor is achieved by use of internals which are uncomplicated to fabricate. Internals are arranged in the reactor which comprise at least one ring and a plurality or ribs.

21 Claims, 2 Drawing Sheets

SHAFT REACTOR FOR TREATING BULK MATERIAL

BACKGROUND OF THE INVENTION a) Field of the Invention

The invention relates to a shaft reactor for treating bulk material, in particular, for the post-condensation of poly (ethylene terephthalate) (PET), poly(ethylenenaphthalate) (PEN) or polyamides (PA) in the solid phase (SSP process), but which is also applicable to the drying of other bulk materials, including granular bulk materials, and the like.

b) Description of the Related Art

Processes and apparatuses for crystallization and post-condensation of PET are adequately known. The post-condensation of PET is conventionally formed in solid phase at temperatures above 200° C. for a period of a plurality of hours in reactors or dryers suitable therefor. The problem is to achieve a highest possible throughput of polyester material of high quality with the lowest possible consumption of energy and use of equipment. The process gas heats the polyester granules evenly and removes reaction products such as EG, water, etc., in which case agglutinations need to be avoided.

To achieve as uniform a countercurrent gas flow as possible, roof-shaped internals are frequently mounted in the preheater which additionally even out the product flow and decrease the bulk pressure, as is described, e.g., in DE-A-4300913.

The fabrication costs for the manufacture of such roof-type dryers are correspondingly high.

DE-C-2753549 describes an agglutination-free SSP process in a moving bed in a shaft reactor. In this case, net-like wire mesh cloths are arranged horizontally in the interior of the reactor at right angles to the reactor wall. The mesh width of the wire cloths is 4–6 times that of the granule size. Tendency to agglutinate, the migration velocity and reaction temperature of the polymer granules determine the spacing between two cloths.

The wire mesh cloths can also be formed in the manner of a chessboard, alternating or star-shaped. However, a disadvantage of this solution is the frequently unilateral product decrease or the non-uniform residence time in the reactor.

The fabrication costs are also high in the case of this solution and the cloths must be matched to the polymer material. All conventional displacement bodies, cones and the like cause a decrease of the usable contents of the reaction.

OBJECT AND SUMMARY OF THE INVENTION

The primary object of the invention, therefore, starting from a generic shaft reactor, is to improve this to the extent that a uniform product flow with low bulk pressure (pressure relief) is achieved by internals which are universal and uncomplicated to fabricate, without significantly decreasing the usable contents.

In accordance with the invention, an improvement is directed to a shaft reactor for treating bulk material, such as for the post-condensation of poly(ethylene terephthalate), poly(ethylene naphthalate) and polyamide in the solid phase, having at least one inlet and one outlet each for the product and process gas. The shaft reactor has internals in the interior of a cylindrical shell. The shell has an inner wall. The improvement is that the internals comprise a ring and ribs arranged in a distributed manner. The ring is fixed by the ribs uniformly spaced from the inner wall of the shell.

Thus, annular internals arranged concentrically to the reactor wall are proposed which are attached by holder elements (ribs) and in such a manner as to align axially. The axial distance between two internals can be the same or different.

The annular internals can be constructed either as simple rings or else in the form of double rings. Possible internals can equally have circular, polygonal or other cross-sectional shapes.

The greater friction of the polymer granules on the reactor wall and on the internals proves to be an advantage, which effects a significantly perceptible reduction of the bulk pressure. Likewise, the product flow, to even it out, is interrupted in stages, which also favors the uniformity of the gas flow and thus of the radial temperature profile.

The height and sequence of the internals is variable as a function of the throughput and other factors. With at least one internal component, there is a change between pressure relief and harmonization zones.

The process procedure can be made more flexible (e.g., with respect to throughput and temperature) and the improvement in stability achieved by the internals also permits reactors of larger diameters to be manufactured. By means of the novel internals, a reactor can, e.g., at high temperature, cover a greater throughput spectrum (both smaller and larger throughput possible).

The invention is described in more detail below with an illustrative example with reference to the drawings.

DESCRIPTION OF THE PREFERRED EMBODIMENTS

Figure 1:
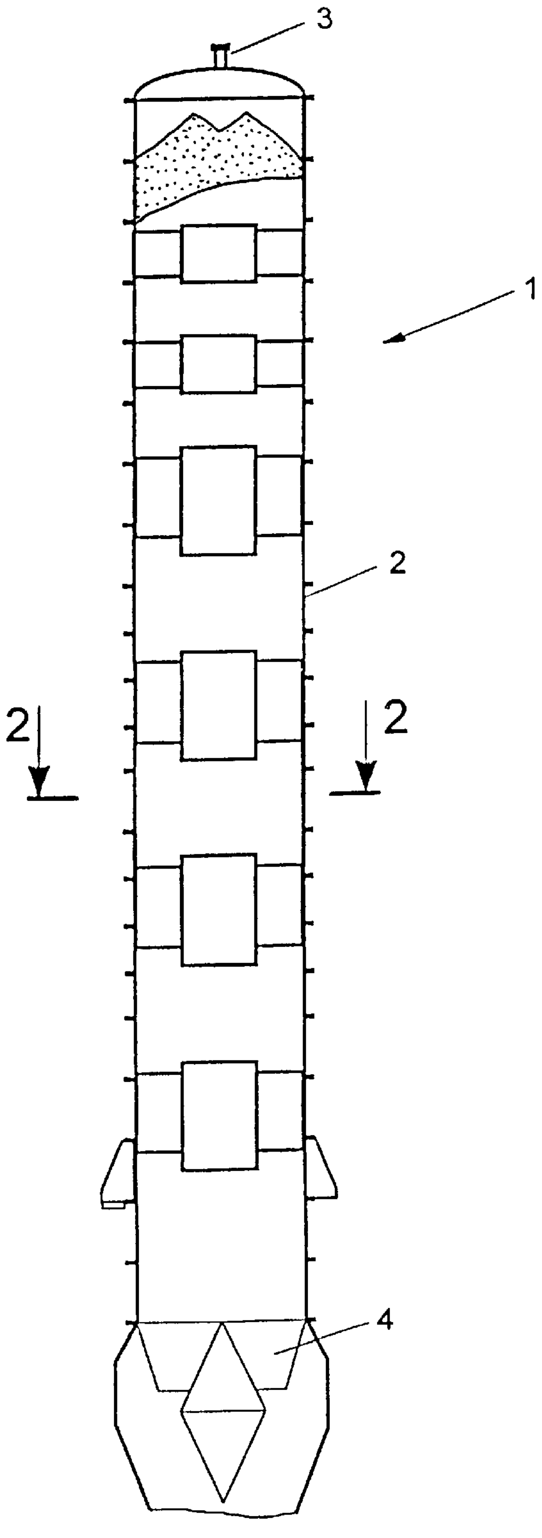
FIG. 1 shows a shaft reactor in longitudinal section.
Figure 2:
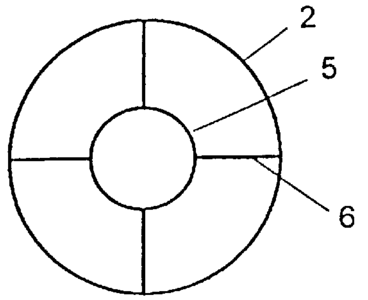
FIG. 2 shows a section A—A as in FIG. 1.
Figure 3:
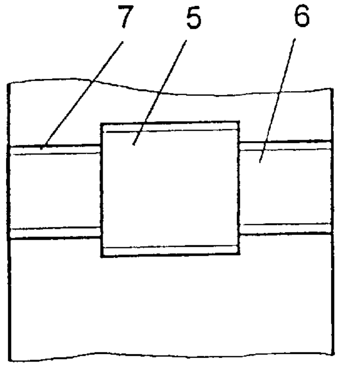
FIG. 3 shows a variant of the internals according to the invention.
Figure 4A:
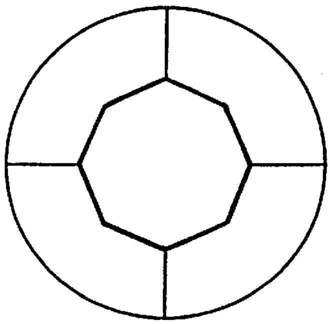
FIG. 4 shows other variants of the internals (a–g).
Figure 4B:
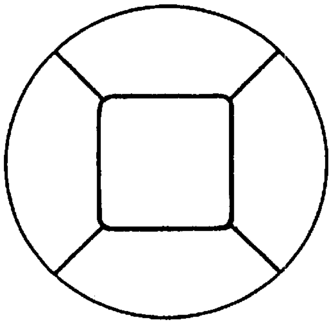
Figure 4C:
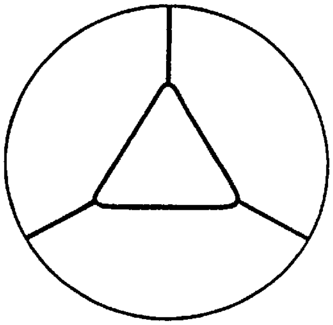
Figure 4D:
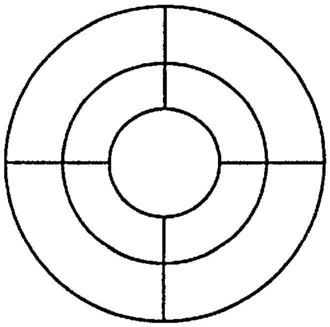
Figure 4E:
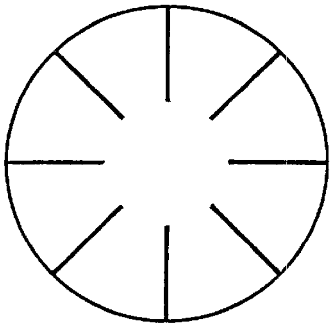
Figure 4F:
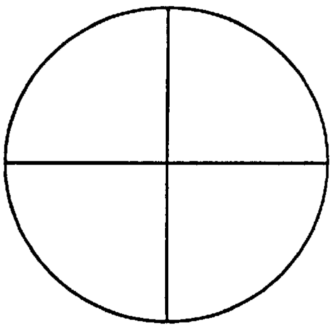
Figure 4G:
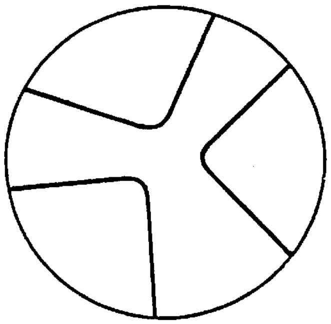

A shaft reactor 1 comprises an essentially cylindrical and closed shell 2 having an inlet 3 and an outlet 4 for the product to be treated and feed port 8 and outlet port 9 for the process gas.

The internals are fixed at right angles to the inner wall of the shell 1 and comprise a ring 5 and two or more ribs 6 in each case. The upper and lower edges 7 of the rings 5 and ribs 6 are each beveled, e.g., at 30°.

The internals are arranged at a distance from each other. The axial distance between the internals can be the same or different.

The reactor diameter is approximately 3.2 m. The diameter of the internals can likewise be the same or different.

The height of the internals is 0.5–8.0 m, preferably 1.0–3.0 m, with variable equalization and position with respect to an empty reactor, the height preferably increasing in the direction of fall of the product.

The shaft reactor 1 and the internals comprise conventional materials, from which there also result the jointing or assembly methods which may be used for the internals.

While the foregoing description and drawings represent the preferred embodiments of the present invention, it will be obvious to those skilled in the art that various changes and modifications may be made therein without departing from the true spirit and scope of the present invention.

LIST OF DESIGNATIONS

1 Shaft reactor
2 Shell
3 Inlet
4 Outlet
5 Ring
6 Rib
7 Edge
8 Feed port
9 Outlet port

What is claimed is:

1. In a shaft reactor for treating bulk material in the solid phase, having at least one inlet and one outlet each for the product and process gas, the shaft reactor having internals in the interior of a cylindrical shell, said shell having an inner wall, the improvement comprising that:

the internals comprise a ring and ribs arranged in a distributed manner, said ring being fixed by said ribs uniformly spaced from said inner wall of the shell, wherein upper and lower edges of the ring and rib elements are beveled.

2. The shaft reactor according to claim 1, wherein the internals each have two rings in the form of a double ring.

3. The shaft reactor according to claim 1, wherein the diameters of the rings are the same in succession.

4. The shaft reactor according to claim 1, wherein the diameters of the rings are different in succession.

5. The shaft reactor according to claim 1, wherein the heights of the internals are the same in the direction of fall of the product.

6. The shaft reactor according to claim 1, wherein the internals are polygons.

7. The shaft reactor according to claim 1, further comprising a granular bulk material contained in the interior region, the granular bulk material being capable of flowing from said product inlet to said product outlet.

8. The shaft reactor according to claim 1, wherein the heights of the internals are different in the direction of the fall of the product.

9. The shaft reactor according to claim 8, wherein the heights of the internals are increasing in the direction of fall of the product.

10. The shaft reactor according to claim 1, wherein the internals have a height of 0.5–8.0 m.

11. The shaft reactor according to claim 10, wherein the internals have a height of 1.0–3.0 m.

12. The shaft reactor according to claim 1, wherein at least two internals are arranged so as to align axially one after the other.

13. The shaft reactor according to claim 12, wherein the internals each have two rings in the form of a hollow cylinder.

14. The shaft reactor according to claim 12, wherein the internals each have two rings in the form of a double ring.

15. The shaft reactor according to claim 1, wherein the internals each have two rings in the form of a hollow cylinder.

16. The shaft reactor according to claim 15, wherein the diameters of the rings are the same in succession.

17. The shaft reactor according to claim 15, wherein the diameters of the rings are different in succession.

18. A bulk material treating system, comprising:

a shaft reactor including a cylindrical shell having an inner wall, an interior region, an inlet at an upper end thereof, and an outlet at a lower end thereof;

a plurality of internals mounted in the interior region of the cylindrical shell, the internals comprising ribs arranged in a distributed manner, said ribs being mounted on said inner wall wherein upper and lower edges of the internalS are beveled;

a granular bulk material contained in the interior region, the granular bulk material being capable of flowing from said inlet to said outlet.

19. The bulk material treating system according to claim 18, wherein the internals further comprise a ring, said ring being fixed by said ribs uniformly spaced from said inner wall.

20. The bulk material treating system according to claim 18, wherein the heights of the internals are increasing in the direction of fall of the product.

21. The bulk material treating system according to claim 18, wherein said bulk material is selected from the group consisting of poly(ethylene terephthalate), poly(ethylene naphthalate) and polyamide in the solid phase.

* * * * *